US009391316B2

(12) United States Patent
Kim et al.

(10) Patent No.: US 9,391,316 B2
(45) Date of Patent: *Jul. 12, 2016

(54) COMPOSITE CATHODE ACTIVE MATERIAL, CATHODE AND LITHIUM BATTERY INCLUDING THE COMPOSITE CATHODE ACTIVE MATERIAL, AND METHOD OF PREPARING THE COMPOSITE CATHODE ACTIVE MATERIAL

(75) Inventors: Gue-sung Kim, Yongin-si (KR); Young-min Choi, Suwon-si (KR); Won-chang Choi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 741 days.

This patent is subject to a terminal disclaimer.

(21) Appl. No.: 13/530,142

(22) Filed: Jun. 22, 2012

(65) Prior Publication Data
US 2012/0326079 A1 Dec. 27, 2012

(30) Foreign Application Priority Data

Jun. 24, 2011 (KR) .................. 10-2011-0061800

(51) Int. Cl.
*H01M 4/88* (2006.01)
*H01M 4/136* (2010.01)
*H01M 4/04* (2006.01)
(Continued)

(52) U.S. Cl.
CPC .............. *H01M 4/136* (2013.01); *C01B 25/45* (2013.01); *H01M 4/0471* (2013.01); *H01M 4/1397* (2013.01); *H01M 4/364* (2013.01); *H01M 4/5825* (2013.01); *H01M 4/624* (2013.01); *H01M 10/052* (2013.01); *H01M 2004/021* (2013.01); *H01M 2004/028* (2013.01); *Y02E 60/122* (2013.01)

(58) Field of Classification Search
CPC ......... H01M 4/38; H01M 4/48; H01M 4/363; H01M 4/58; H01M 4/131; H01M 4/485
USPC .............. 252/182.1, 518.1; 429/218.1, 231.1, 429/231.95, 231.9
See application file for complete search history.

(56) References Cited

U.S. PATENT DOCUMENTS

2004/0185343 A1  9/2004  Wang et al.
2006/0188784 A1  8/2006  Sudoh et al.
(Continued)

FOREIGN PATENT DOCUMENTS

CN  101070148 A  11/2007
CN  101364643 A  2/2009
(Continued)

OTHER PUBLICATIONS

European Search Report in EP 12173128.5-2119, dated Sep. 19, 2012 (Kim, et al.).
(Continued)

*Primary Examiner* — Khanh Tuan Nguyen
(74) *Attorney, Agent, or Firm* — Lee & Morse, P.C.

(57) ABSTRACT

A composite cathode active material, a cathode and a lithium battery including the composite cathode, and a method of preparing the composite cathode active material, the composite cathode active material including a compound with an olivine crystal structure; and an inorganic material, the inorganic material including a nitride or carbide of at least one element selected from the group of Group 2, Group 13, Group 14, and Group 15 of the periodic table of elements.

15 Claims, 2 Drawing Sheets

(51) Int. Cl.
*H01M 4/1397* (2010.01)
*H01M 4/36* (2006.01)
*H01M 4/58* (2010.01)
*H01M 4/62* (2006.01)
*H01M 10/052* (2010.01)
*C01B 25/45* (2006.01)
*H01M 4/02* (2006.01)

(56) References Cited

U.S. PATENT DOCUMENTS

2007/0207385 A1* 9/2007 Liu .................. H01M 4/131 429/231.9
2008/0107967 A1 5/2008 Liu et al.
2012/0070357 A1* 3/2012 Prilutsky et al. .............. 423/290
2013/0071753 A1* 3/2013 Kim et al. ................ 429/231.95

FOREIGN PATENT DOCUMENTS

| | | |
|---|---|---|
| CN | 101540398 A | 9/2009 |
| JP | 08-255615 A | 10/1996 |
| KR | 10-2006-0052902 A | 5/2006 |
| WO | WO 2004/068616 A2 | 8/2004 |

OTHER PUBLICATIONS

Chinese Office Action dated Jun. 30, 2015 in Corresponding Chinese Patent Application No. 201210156419.7.

* cited by examiner

COMPOSITE CATHODE ACTIVE MATERIAL, CATHODE AND LITHIUM BATTERY INCLUDING THE COMPOSITE CATHODE ACTIVE MATERIAL, AND METHOD OF PREPARING THE COMPOSITE CATHODE ACTIVE MATERIAL

BACKGROUND

1. Field

Embodiments relate to a composite cathode active material, a cathode and a lithium battery that include the composite cathode active material, and a method of preparing the composite cathode active material.

2. Description of the Related Art

With a trend toward small, high-performance devices, manufacturing of lithium batteries that are small, lightweight, and have high energy densities has been considered. For application in electric vehicles, cycle characteristics of lithium batteries at room temperature and at high-temperatures may be an important concern. Thus, functionality of lithium batteries as a power storage device is becoming more important.

To implement a lithium battery for these uses, a variety of cathode active materials have been considered. For example, a cathode active material with an olivine crystal structure (including, e.g., a phosphorus oxide) may exhibit better stability at high temperatures, as compared with $LiCoO_2$.

SUMMARY

Embodiments are directed to a composite cathode active material, a cathode and a lithium battery that include the composite cathode active material, and a method of preparing the composite cathode active material.

The embodiments may be realized by providing a composite cathode active material including a compound with an olivine crystal structure; and an inorganic material, the inorganic material including a nitride or carbide of at least one element selected from the group of Group 2, Group 13, Group 14, and Group 15 of the periodic table of elements.

The inorganic material may not include a nitride of a transition metal.

The compound with the olivine crystal structure may be represented by Formula 1 below:

$$Li_xMe_yM_zPO_{4-d}X_d \quad \text{[Formula 1]}$$

wherein, in Formula 1, $0.6 \leq x \leq 1.1$, $0 \leq y \leq 1.1$, $0 \leq z \leq 1$, $1.6 \leq x+y+z \leq 2.2$, and $0 \leq d \leq 0.2$; Me includes at least one selected from the group of iron (Fe), manganese (Mn), nickel (Ni), and cobalt (Co); M includes at least one selected from the group of magnesium (Mg), calcium (Ca), copper (Cu), neodymium (Nd), strontium (Sr), barium (Ba), titanium (Ti), zirconium (Zr), niobium (Nb), molybdenum (Mo), tungsten (W), zinc (Zn), aluminum (Al), and silicon (Si); and X includes at least one selected from the group of sulfur (S) and fluorine (F).

The compound with the olivine crystal structure may be represented by Formula 2 below:

$$Li_xMn_{1-z}M'_zPO_{4-d}X_d \quad \text{Formula 2}$$

wherein, in Formula 2, $0.6 \leq x \leq 1.1$, $0 \leq z \leq 0.2$, and $0 \leq d \leq 0.2$; M' includes at least one selected from the group of Fe, Ni, Co, Mg, Ca, Cu, Nd, Sr, Ba, Ti, Zr, Nb, Mo, W, Zn, Al, and Si; and X includes at least one selected from the group of S and F.

The compound with the olivine crystal structure may include at least one selected from the group of $LiFePO_4$, $LiFe_{1-a}Mn_aPO_4 (0<a<1)$, and $LiMnPO_4$.

The inorganic material may include a nitride or carbide of a metalloid element selected from the group of Group 13, Group 14, and Group 15 of the periodic table of elements.

The inorganic material may include at least one selected from the group of boron nitride (BN), boron carbide ($B_4C$), silicon nitride ($Si_3N_4$), silicon carbide (SiC), a boron nitride-boron carbide complex, a boron nitride-silicon nitride ($Si_3N_4$) complex, and a boron nitride-silicon carbide (SiC) complex.

The inorganic material may include boron.

The inorganic material may include at least one selected from the group of an amorphous boron nitride, a boron nitride with a cubic crystalline structure, a boron nitride with a hexagonal crystalline structure, and a boron nitride with a wurtzite crystalline structure.

The inorganic material may be in the form of at least one selected from the group of a nanoparticle, a nanofiber, a nanomesh, and a nanotube.

The inorganic material may have a Mohs hardness greater than a Mohs hardness of the compound with the olivine crystal structure.

The inorganic material may have a Mohs hardness of about 1 or greater.

The inorganic material may have an electrical conductivity lower than that of amorphous carbon.

The inorganic material may have an electrical conductivity of about $10^{-1}$ S/cm or less.

The composite cathode active material may be represented by Formula 3 below:

$$(1-r)Li_xMe_yM_zPO_{4-d}X_d \cdot rM''_bZ_c \quad \text{Formula 3}$$

wherein, in Formula 1, $0.6 \leq x \leq 1.1$, $0 \leq y \leq 1.1$, $0 \leq z \leq 1$, $1.6 \leq x+y+z \leq 2.2$, $0 \leq d \leq 0.2$, and $0<r<1$; Me includes at least one selected from the group of iron (Fe), manganese (Mn), nickel (Ni), and cobalt (Co); M includes at least one selected from the group of magnesium (Mg), calcium (Ca), copper (Cu), neodymium (Nd), strontium (Sr), barium (Ba), titanium (Ti), zirconium (Zr), niobium (Nb), molybdenum (Mo), tungsten (W), zinc (Zn), aluminum (Al), and silicon (Si); M'' includes at least one selected from the group of boron (B), silicon (Si), germanium (Ge), arsenic (As), and antimony (Sb); Z is C or N; X includes at least one selected from the group of sulfur (S) and fluorine (F); b is an integer of 1 to 5; and c is an integer of 1 to 5.

r may satisfy the relation $0.01<r\leq 0.3$.

The composite cathode active material may be represented by Formula 4 below:

$$(1-r)Li_xMn_{1-z}M'_zPO_{4-d}X_d \cdot rM''_bZ_c \quad \text{Formula 4}$$

wherein, in Formula 4, $0.6 \leq x \leq 1.1$, $0 \leq z \leq 0.2$, $0 \leq d \leq 0.2$, and $0<r<1$; M' includes at least one selected from the group of Fe, Ni, Co, Mg, Ca, Cu, Nd, Sr, Ba, Ti, Zr, Nb, Mo, W, Zn, Al, and Si; X includes at least one selected from the group of sulfur (S) and fluorine (F); M'' includes at least one selected from the group of boron (B), silicon (Si), germanium (Ge), arsenic (As), and antimony (Sb); Z is C or N; b is an integer of 1 to 5; and c is an integer of 1 to 5.

r may satisfy the relation $0.01<r\leq 0.3$.

The composite cathode active material may further include a carbonaceous material.

The carbonaceous material may be included in an amount of about 0.1 wt % to about 30 wt % based on a total weight of the composite cathode active material.

The embodiments may also be realized by providing a cathode including the composite cathode active material according to an embodiment.

The embodiments may also be realized by providing a lithium battery including the cathode according to an embodiment.

The embodiments may also be realized by providing a method of preparing a composite cathode active material, the method including sintering, under an inert atmosphere, a mixture of a precursor of a compound with an olivine crystal structure, and an inorganic material, wherein the inorganic material includes a nitride or carbide of at least one element selected from the group of Group 2, Group 13, Group 14, and Group 15 of the periodic table of elements.

The precursor of the compound with the olivine crystal structure may include a lithium precursor, a phosphate ($PO_4$) precursor, and a transition metal precursor.

The sintering may be performed at a temperature of about 400° C. to about 900° C. for about 2 hours to about 48 hours.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
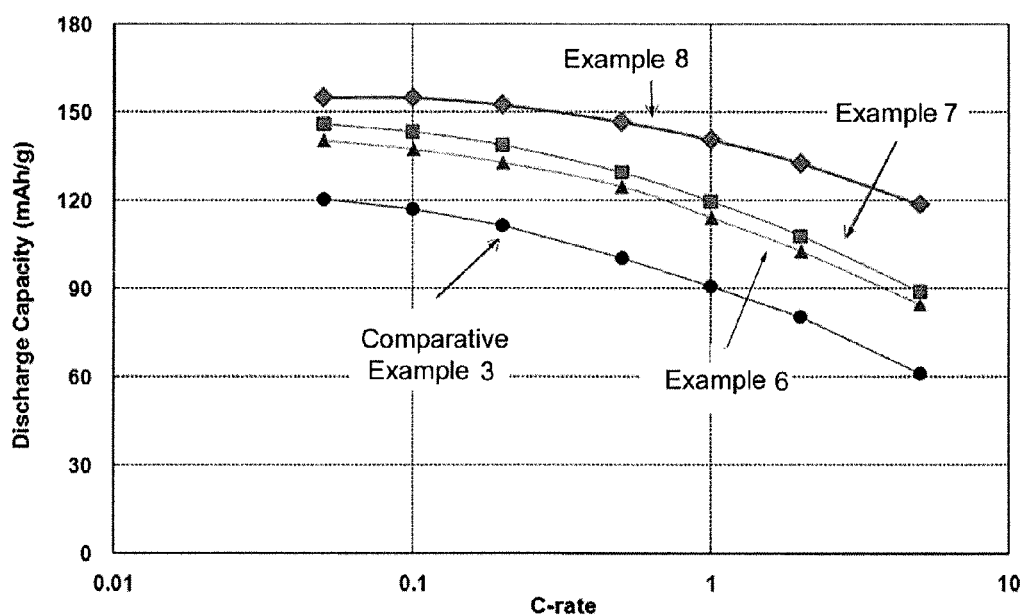
FIG. 1 illustrates a graph showing results of a charge/discharge test on lithium batteries manufactured in Examples 7-9 and Comparative Example 3.

Korean Patent Application No. 10-2011-0061800, filed on Jun. 24, 2011, in the Korean Intellectual Property Office, and entitled: "Composite Cathode Active Material, Cathode and Lithium Battery Including the Composite Cathode Active Material, and Method of Preparing the Composite Cathode Active Material," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Hereinafter, one or more embodiments of a composite cathode active material, a cathode and a lithium battery each including the composite active material, and a method of preparing the composite active material will be described in greater detail.

According to an embodiment, there is provided a composite cathode active material including a compound with an olivine crystal structure and an inorganic material. The inorganic material may include a nitride or carbide of at least one element from Group 2, Group 13, Group 14, and Group 15 of the periodic table of elements.

The inorganic material, e.g., a thermally and chemically stable non-transition metal nitride and/or carbide, may serve as a dispersant in preparing the composite cathode active material. Such a dispersant may help improve dispersibility of the compound with the olivine crystal structure, and consequently may help improve electrical conductivity of the composite cathode active material and may help improve high-rate properties of a lithium battery including the composite cathode active material.

The inorganic material of the composite cathode active material may exclude, e.g., may not include, a nitride of a transition metal. For example, the inorganic material may exclude a nitride or nitrioxide of a transition metal that is included in the compound with the olivine crystal structure. In an implementation, the inorganic material may exclude a nitride or nitrioxide of Fe, Mn, or V.

The compound with the olivine crystal structure may have an electrical conductivity as low as, e.g., less than about $10^{-7}$ S/cm. For example, $LiFePO_4$ and $LiMnPO_4$ may have a low conductivity of about $10^{-9}$ S/cm and about $10^{-10}$ S/cm, respectively. Accordingly, the inorganic material may be added to help improve the electrical conductivity of the composite cathode active material. The inorganic material may help improve the electrical conductivity of the compound of the olivine crystal structure by being dispersed in the composite cathode active material.

The compound with the olivine crystal structure of the composite cathode active material may be represented by Formula 1, below.

$$Li_xMe_yM_zPO_{4-d}X_d \qquad \text{Formula 1}$$

In Formula 1, $0.6 \le x \le 1.1$, $0 < y \le 1.1$, $0 \le z \le 1$, $1.6 \le x+y+z \le 2.2$, and $0 \le d \le 0.2$. Me may include at least one selected from the group of iron (Fe), manganese (Mn), nickel (Ni), and cobalt (Co); M may include at least one selected from the group of magnesium (Mg), calcium (Ca), copper (Cu), neodymium (Nd), strontium (Sr), barium (Ba), titanium (Ti), zirconium (Zr), niobium (Nb), molybdenum (Mo), tungsten (W), zinc (Zn), aluminum (Al), and silicon (Si). X may include at least one selected from the group of sulfur (S) and fluorine (F).

In an implementation, in Formula 1, $0.6 \le x \le 1.1$, $0.9 \le y \le 1.1$, $0 \le z \le 0.2$, and $0 \le d \le 0.2$.

For example, the compound with the olivine crystal structure may be represented by Formula 2, below.

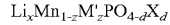

$$Li_xMn_{1-z}M'_zPO_{4-d}X_d \qquad \text{Formula 2}$$

In Formula 2, $0.6 \le x \le 1.1$, $0 \le z \le 0.2$, and $0 \le d \le 0.2$. M' may include at least one selected from the group of Fe, Ni, Co, Mg, Ca, Cu, Nd, Sr, Ba, Ti, Zr, Nb, Mo, W, Zn, Al, and Si. X may include at least one selected from the group of S and F.

In an implementation, the compound with the olivine crystal structure may include at least one selected from the group of $LiFePO_4$, $LiFe_{1-a}Mn_aPO_4$ ($0<a<1$), and $LiMnPO_4$.

The inorganic material of the composite cathode active material may include a nitride or carbide of a metalloid element, e.g., a metalloid element of Group 13, Group 14, or Group 15.

In an implementation, the inorganic material may include at least one selected from the group of boron nitride (BN), boron carbide ($B_4C$), silicon nitride ($Si_3N_4$), silicon carbide (SiC), a boron nitride-boron carbide complex, a boron nitride-silicon nitride ($Si_3N_4$) complex, and a boron nitride-silicon carbide (SiC) complex.

In another implementation, the inorganic material of the composite cathode active material may include boron. For example, the inorganic material may include boron nitride or boron carbide.

The inorganic material of the composite cathode active material may include at least one selected from the group of an amorphous boron nitride, a boron nitride with a cubic crystalline structure, a boron nitride with a hexagonal crystalline structure, and a boron nitride with a wurtzite crystalline structure.

In an implementation, the inorganic material of the composite cathode active material may be in the form of at least one selected from the group of a nanoparticle, a nanofiber, a nanomesh, and a nanotube.

In an implementation, the inorganic material of the composite cathode active material may be of a nano size. For example, the inorganic material may be in the form of nanoparticles having an average diameter of about 10 nm to about 500 nm. In another implementation, the inorganic material may be in the form of microparticles having an average diameter of about 1 µm or greater.

The inorganic material of the composite cathode active material may have a Mohs hardness greater than a Mohs hardness of the compound with the olivine crystal structure. Due to having a greater Mohs hardness than that of the compound with the olivine crystal structure, the inorganic material may be able to disperse the compound with the olivine crystal structure.

In an implementation, the inorganic material of the composite cathode active material may have a Mohs hardness of about 1 or greater. For example, the inorganic material may have a Mohs hardness from about 1 to about 10. The inorganic material having a Mohs hardness of about 1 or greater may help improve charge/discharge characteristics of a lithium battery. For example, the inorganic material with a Mohs hardness of about 1 or greater may be boron nitride.

The inorganic material may have an electrical conductivity lower than that of amorphous carbon. Although the inorganic material may have a lower electrical conductivity than amorphous carbon (that is a common carbonaceous material), the inorganic material may help improve dispersiblity of the compound with the olivine crystal structure. Accordingly, electrical conductivity of the composite cathode active material and charge/discharge characteristics of a lithium battery may be improved.

The inorganic material of the composite cathode active material may have an electrical conductivity of about $10^{-1}$ S/cm or less. In an implementation, the inorganic material may have an electrical conductivity of about $10^{-3}$ S/cm or less, e.g., about $10^{-5}$ S/cm to about $10^{-16}$ S/cm. For example, the inorganic material may be boron nitride.

The inorganic material may be included in the composite cathode active material in an amount of about 20 wt % or less, based on a total weight of the composite cathode active material. In an implementation, the inorganic material may be included in an amount of about 10 wt % or less, e.g., about 0.01 wt % to about 10 wt %, about 0.1 wt % to about 10 wt %, or about 0.5 wt % to about 10 wt %, based on the total weight of the composite cathode active material.

The composite cathode active material (which is a composite of the compound with the olivine crystal structure and the inorganic material), may be represented by Formula 3, below:

   Formula 3

In Formula 3, $0.6 \leq x \leq 1.1$, $0 < y \leq 1.1$, $0 \leq z \leq 1$, $1.6 \leq x+y+z \leq 2.2$, $0 \leq d \leq 0.2$, and $0 < r < 1$. Me may include at least one selected from the group of Fe, Mn, Ni, and Co; M may include at least one selected from the group of Mg, Ca, Cu, Nd, Sr, Ba, Ti, Zr, Nb, Mo, W, Zn, Al, and Si. M" may include at least one selected from the group of B, Si, Ge, As, and Sb. Z may be C or N. X may include at least one selected from the group of S and F. b may be an integer from 1 to 5, and c may be an integer from 1 to 5. In an implementation, in Formula 3, $0.6 \leq x \leq 1.1$, $0.9 \leq y \leq 1.1$, $0 \leq z \leq 0.2$, $0 \leq d \leq 0.2$, and $0 < r < 1$.

In an implementation, in the composite cathode active material of Formula 3, $0.005 < r \leq 0.3$. In another implementation, in the composite cathode active material of Formula 3, $0.01 < r \leq 0.3$. The inorganic material may be included in the composite cathode active material in an amount of about 1 mole % to about 30 mole %.

In an implementation, the composite cathode active material may be represented by Formula 4, below:

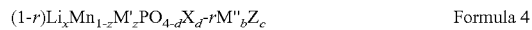   Formula 4

In Formula 4, $0.6 \leq x \leq 1.1$, $0 \leq z \leq 0.2$, $0 \leq d \leq 0.2$, and $0 < r < 1$. M' may include at least one selected from the group of Fe, Ni, Co, Mg, Ca, Cu, Nd, Sr, Ba, Ti, Zr, Nb, Mo, W, Zn, Al, and Si. X may include at least one selected from the group of S and F. M" may include at least one selected from the group of B, Si, Ge, As, and Sb. Z may be C or N. b may be an integer from 1 to 5, and c may be an integer from 1 to 5. In an implementation, in the composite cathode active material of Formula 4, $0.005 < r \leq 0.3$. In another implementation, in the composite cathode active material of Formula 4, $0.01 < r \leq 0.3$.

Examples of the composite cathode active material may include $(1-r)LiMn_{1-z}$. $Fe_zPO_{4-d}X_d$-rBN and $(1-r)LiMn_{1-z}$ $Fe_zPO_{4-d}X_d$-rB$_4$C.

A transition metal in the compound with the olivine crystal structure may partially form a chemical bond with the inorganic material in the composite cathode active material. The chemical bond may partially change a structure of the compound with the olivine crystal structure, thereby improving the electrical conductivity of the composite cathode active material.

In an implementation, the inorganic material in the composite cathode active material may be partially coated on a surface of the compound with the olivine crystal structure. For example, the composite cathode active material may have a structure with a coating layer of the inorganic material on part of the surface of the compound with the olivine crystal structure serving as a core. In another implementation, the composite cathode active material may have a structure in which the inorganic material is dispersed.

The composite cathode active material may further include a carbonaceous material. The inclusion of the carbonaceous material may help further improve the electrical conductivity of the composite cathode active material. The carbonaceous material may include at least one selected from the group of graphite, carbon black, amorphous carbon, fibrous carbon, and a combination thereof. Any suitable carbonaceous material that is capable of improving the conductivity of the composite cathode active material may be used.

The carbonaceous material may be included in an amount of about 0.1 wt % to about 30 wt %, based on the total weight of the composite cathode active material. However, the embodiments are not limited thereto, and the amount may be appropriately adjusted within a range to help improve the electrical conductivity of the composite cathode active material. In an implementation, the amount of the carbonaceous material may be about 1 wt % to about 20 wt %, e.g., about 1 wt % to about 10 wt %, based on the total weight of the composite cathode active material.

The embodiments also provide a cathode including the composite cathode active material.

The cathode may be manufactured as follows. First, the above-described composite cathode active material, a conducting agent, a binder, and a solvent may be mixed to prepare a cathode active material composition. The cathode active material composition may be directly coated on an aluminum current collector and dried to form a cathode active film on a cathode plate. Alternatively, the cathode active material composition may be cast on a separate support to form a cathode active material film, which may then be separated from the support and laminated on an aluminum current collector to prepare a cathode plate with the cathode active material film.

Non-limiting examples of the conducting agent may include carbon black, graphite particulates, natural graphite, artificial graphite, acetylene black, ketjen black, carbon fibers, metallic materials, such as copper, nickel, aluminum, silver, or the like, in powder, fiber, or tube form, and a conductive polymer such as polyphenylene derivatives. Any suitable conducting agent may be used.

Non-limiting examples of the binder may include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. Non-limiting examples of the solvent may include N-methyl-pyrrolidone (NMP), acetone, and water. Any suitable material available for these purposes may be used.

In an implementation, a plasticizer may be further added to the cathode active material composition to form a cathode plate with pores.

Amounts of the composite cathode active material, the conducting agent, the binder, and the solvent may be those generally used in the manufacture of a lithium battery. At least one of the conducting agent, the binder, and the solvent may not be included according to the use and the structure of the lithium battery.

In an implementation, the cathode may further include a common cathode active material, in addition to the composite cathode active material.

The common cathode active material may include any suitable common cathode active material, e.g., a lithium-containing metal oxide. The common cathode active material may include at least one of a composite oxide of lithium with a metal selected from among Co, Mn, Ni, and a combination thereof. For example, the common cathode active material may include at least one compound selected from $Li_aA_{1-b}B_bD_2$ (where $0.90 \le a \le 1.8$, and $0 \le b \le 0.5$), $Li_aE_{1-b}B_bO_{2-c}D_c$ (where $0.90 \le a \le 1.8$, $0 \le b \le 0.5$, and $0 \le c \le 0.05$), $LiE_{2-b}B_bO_{4-c}D_c$ (where $0 \le b \le 0.5$, and $0 \le c \le 0.05$), $Li_aNi_{1-b-c}Co_bB_cD_\alpha$ (where $0.90 \le a \le 1.8$, $0 \le b \le 0.5$, $0 \le c \le 0.05$, and $0 < \alpha \le 2$), $Li_aNi_{1-b-c}Co_bB_cO_{2-\alpha}F_\alpha$ (where $0.90 \le a \le 1.8$, $0 \le b \le 0.5$, $0 \le c \le 0.05$, and $0 < \alpha < 2$), $Li_aNi_{1-b-c}Co_bB_cO_{2-\alpha}F_2$ (where $0.90 \le a \le 1.8$, $0 \le b \le 0.5$, $0 \le c \le 0.05$, and $0 < \alpha < 2$), $Li_aNi_{1-b-c}Mn_bB_cD_\alpha$ (where $0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, and $0 < \alpha < 2$), $Li_aNi_{1-b-c}Mn_bB_cO_{2-\alpha}F_2$ (where $0.90 \le a \le 1.8$, $0 \le b \le 0.5$, $0 \le c \le 0.05$, and $0 < \alpha < 2$), $Li_aNi_bE_cG_dO_2$ (where $0.90 \le a \le 1.8$, $0 \le b \le 0.9$, $0 \le c \le 0.5$, and $0.001 \le d \le 0.1$), $Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$), $Li_aNi_bO_2$ (where $0.90 \le a \le 1.8$, and $0.001 \le b \le 0.1$), $Li_aCoG_bO_2$ (where $0.90 \le a \le 1.8$, and $0.001 \le b \le 0.1$), $Li_aMnG_bO_2$ (where $0.90 \le a \le 1.8$, and $0.001 \le b \le 0.1$), $Li_aMn_2G_bO_4$ (where $0.90 \le a \le 1.8$, and $0.001 \le b \le 0.1$), $QO_2$, $QS_2$, $LiQS_2$, $V_2O_5$, $LiV_2O_5$, $LiIO_2$, $LiNiVO_4$, $Li_{(3-f)}J_2(PO_4)_3 (0 \le f \le 2)$, $Li_{(3-f)}Fe_2(PO_4)_3 (0 \le f \le 2)$, and $LiFePO_4$.

In the formulae above, A may be selected from the group of nickel (Ni), cobalt (Co), manganese (Mn), and combinations thereof; B may be selected from the group of aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from the group of oxygen (O), fluorine (F), sulfur (S), phosphorus (P), and combinations thereof; E may be selected from the group of cobalt (Co), manganese (Mn), and combinations thereof; F may be selected from the group of fluorine (F), sulfur (S), phosphorus (P), and combinations thereof; G may be selected from the group of aluminum (Al), chromium (Cr), manganese (Mn), iron (Fe), magnesium (Mg), lanthanum (La), cerium (Ce), strontium (Sr), vanadium (V), and combinations thereof; Q may be selected from the group of titanium (Ti), molybdenum (Mo), manganese (Mn), and combinations thereof; I may be selected from the group of chromium (Cr), vanadium (V), iron (Fe), scandium (Sc), yttrium (Y), and combinations thereof; and J may be selected from the group of vanadium (V), chromium (Cr), manganese (Mn), cobalt (Co), nickel (Ni), copper (Cu), and combinations thereof.

Examples of the common cathode active material may include $LiCoO_2$, $LiMn_xO_{2x}(x=1, 2)$, $LiNi_{1-x}Mn_xO_{2x}(0<x<1)$, $Ni_{1-x-y}Co_xMn_yO_2$ ($0 \le x \le 0.5$, $0 \le y \le 0.5$), and $LiFePO_4$.

The compounds listed above as cathode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from the group of an oxide, a hydroxide, an oxyhydroxide, an oxycarbonate, and a hydroxycarbonate of the coating element. The compounds for the coating layer may be amorphous or crystalline. The coating element for the coating layer may include, e.g., magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any suitable method that does not adversely affect physical properties of the cathode active material when a compound of the coating element is used. For example, the coating layer may be formed using a spray coating method, a dipping method, or the like.

Another embodiment provides a lithium battery including the cathode containing the composite cathode active material. The lithium battery may be manufactured in the following manner.

First, a cathode may be prepared according to the above-described cathode formation method.

Next, an anode may be manufactured as follows. The anode may be manufactured in the same manner as the cathode, except for using an anode active material instead of the composite cathode active material. A conducting agent, a binder, and a solvent used to prepare an anode active material composition may be the same as those used in the cathode active material composition.

For example, an anode active material, a conducting agent, a binder, and a solvent may be mixed to prepare an anode active material composition, which may then be directly coated on a copper current collector, thereby manufacturing an anode plate. Alternatively, the anode active material composition may be cast on a separate support, and then an anode active material film separated from the support may be laminated on a copper current collector to prepare an anode plate.

The anode active material may include any suitable anode active material for a lithium battery. For example, the anode active material may include at least one selected from the group of lithium metal, a metal that is alloyable with lithium, a transition metal oxide, a non-transition metal oxide, and a carbonaceous material.

Examples of the metal alloyable with lithium may include Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof except for Si), and a Sn—Y alloy (where Y is an alkali metal, an alkali earth metal, a Group XIII element, a Group XIV element, a transition metal, a rare earth element, or a combination thereof except for Sn). Y may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Non-limiting examples of the transition metal oxide may include a lithium titanium oxide, a vanadium oxide, and a lithium vanadium oxide.

Non-limiting examples of the non-transition metal oxide may include $SnO_2$ and $SiO_x$ ($0<x<2$).

Examples of the carbonaceous material may include crystalline carbon, amorphous carbon, and mixtures thereof. Examples of the crystalline carbon may include graphite, such as natural graphite or artificial graphite that are in amorphous, plate, flake, spherical or fibrous form. Examples of the amorphous carbon may include soft carbon (carbon sintered at low temperatures), hard carbon, meso-phase pitch carbides, sintered corks, and the like.

Amounts of the anode electrode active material, the conducting agent, the binder, and the solvent may be those generally used in the manufacture of a lithium battery.

Next, a separator (to be disposed between the cathode and the anode) may be prepared. The separator for the lithium battery may include any suitable separator that is commonly used in lithium batteries. The separator may have low resistance to migration of ions in an electrolyte and may have an excellent electrolyte-retaining ability. Examples of the separator may include glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may include any suitable material that is commonly used as a binder for electrode plates. Examples of the polymer resin may include a vinylidenefluoride/hexafluoropropylene copolymer, polyvinylidene fluoride (PVDF), polyacrylonitrile, polymethylmethacrylate and a mixture thereof.

Next, an electrolyte may be prepared. For example, the electrolyte may be an organic electrolyte solution. Alternatively, the electrolyte may be in a solid phase. Non-limiting examples of the electrolyte may include lithium oxide and lithium oxynitride. Any suitable solid electrolyte may be used. The solid electrolyte may be formed on the anode by, e.g., sputtering.

In an implementation, an organic electrolyte solution may be prepared as follows. The organic electrolyte solution may be prepared by dissolving a lithium salt in an organic solvent.

The organic solvent may include any suitable organic solvent. Examples of the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may include any suitable lithium salt. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI and a mixture thereof.

Figure 2:
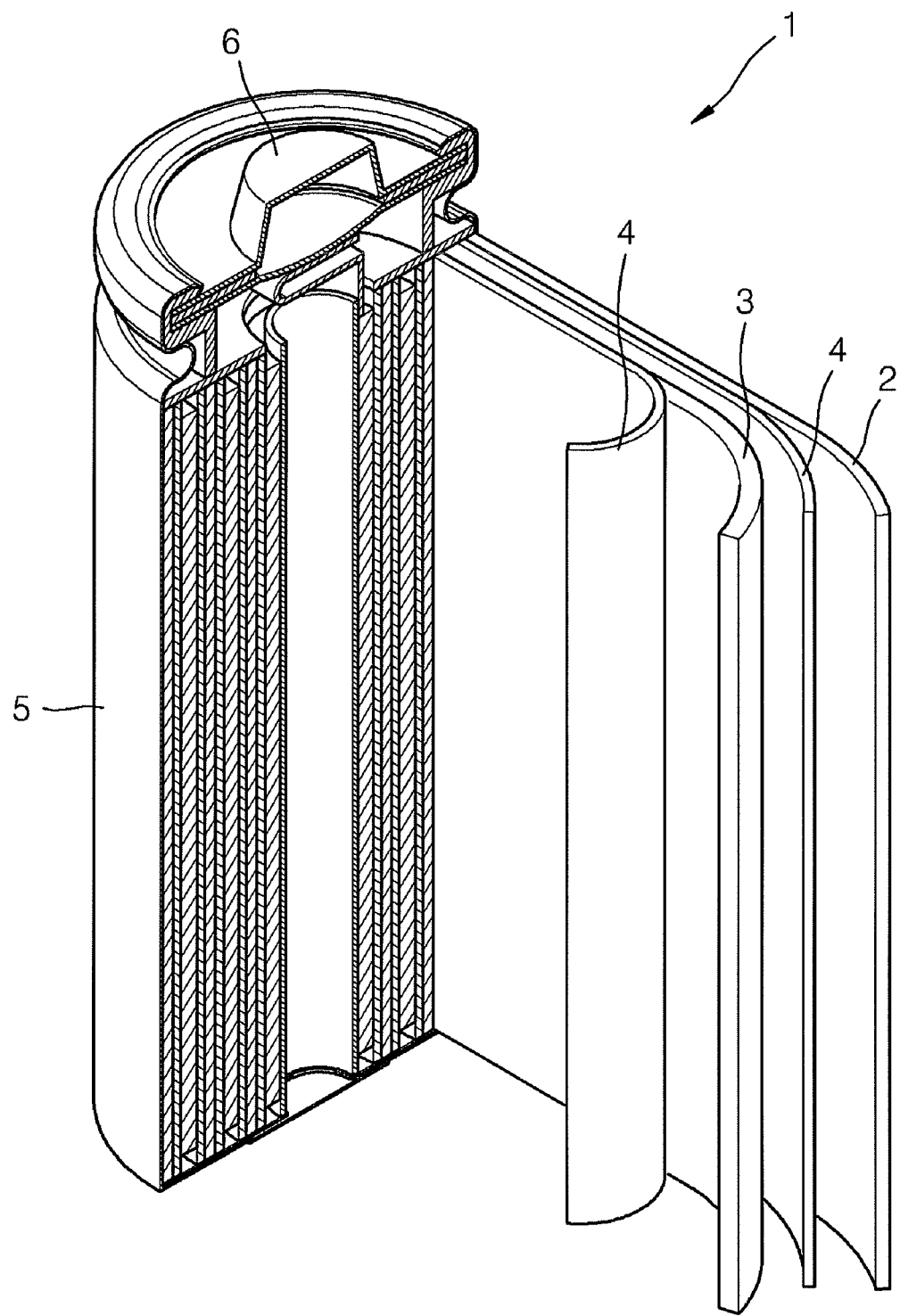
FIG. 2 illustrates a schematic view of a lithium battery according to an embodiment.

FIG. 2 illustrates a schematic view of a lithium battery according to an embodiment. Referring to FIG. 2, a lithium battery 1 may include a cathode 3, an anode 2, and a separator 4. The cathode 3, the anode 2, and the separator 4 may be wound or folded, and then sealed in a battery case 5. Then, the battery case 5 may be filled with an organic electrolyte solution and sealed with a cap assembly 6, thereby completing the manufacture of the lithium battery 1. The battery case 5 may be a cylindrical type, a rectangular type, or a thin-film type. For example, the lithium battery may be a thin-film type battery. The lithium battery may be a lithium ion battery.

The separator may be interposed between the cathode and the anode to form a battery or electrode assembly. Alternatively, the battery or electrode assembly may be stacked in a bi-cell structure and impregnated with the electrolyte solution. The resultant structure may be put into a pouch and hermetically sealed, thereby completing the manufacture of a lithium ion polymer battery.

In an implementation, a plurality of batteries may be stacked to form a battery pack, which may be used in any device that operates at high temperatures and requires high output, e.g., in a laptop computer, a smart phone, electric vehicle, or the like.

The lithium battery may have high discharge capacity and improved high rate characteristics, and thus may be applicable in an electric vehicle (EV), e.g., in a hybrid vehicle such as plug-in hybrid electric vehicle (PHEV). The lithium battery may be applicable to a high-power storage field, e.g., in an electric bicycle, a power tool, or the like.

The embodiments also provide a method of preparing a composite cathode active material. The method may include sintering a mixture of a precursor of a compound with an olivine crystal structure and an inorganic material under an inert atmosphere, e.g., a nitrogen atmosphere. The inorganic material may include a nitride or carbide of at least one element of Group 2, Group 13, Group 14, and Group 15 of the periodic table of elements.

In the method of preparing the composite cathode active material, the precursor of the compound with the olivine crystal structure may include a lithium precursor, a phosphate ($PO_4$) precursor, and a transition metal precursor.

In an implementation, the lithium precursor may include at least one selected from the group of lithium carbonate ($Li_2CO_3$), lithium nitride ($LiNO_3$), lithium acetate ($LiCH_3COO$), lithium sulfide (LiS), lithium iodide (LiI), and lithium hydroxide (LiOH). Any suitable material available as a lithium precursor may be used.

The phosphate ($PO_4$) precursor may include, e.g., $NH_4H_2PO_4$, $H_3PO_4$, or the like. Any suitable material available as a phosphate precursor may be used.

The transition metal precursor may include at least one selected from the group of manganese carbonate ($MnCO_3$), magnesium nitrate ($Mg(NO_3)_2$), iron oxalate ($FeC_2O_4$), iron acetate ($Fe(CH_3COO)_2$), iron acetylacetonate ($Fe(C_5H_7O_2)_2$), manganese acetate ($Mn(CH_3COO)_2$), iron sulfate ($FeSO_4$), iron chloride ($Fe(Cl)_2$), iron citrate ($FeC_6H_5O_7$), and iron perchlorate ($Fe(ClO_4)_2$). Any suitable material available as a transition metal precursor may be used.

The inorganic material used in the preparing of the composite cathode active material may include an electrical insulator. The electrical insulator may have an electrical conductivity of about $10^{-3}$ S/cm or less. In an implementation, the electrical insulator may have an electrical conductivity from about $10^{-5}$ to about $10^{-16}$ S/cm.

The inorganic material used in the preparing of the composite cathode active material may have a Mohs hardness of about 1 or greater. For example, the inorganic material may have a Mohs hardness from about 1 to about 10. The inclusion of the inorganic material with a Mohs hardness of about 1 or greater may help improve the charge/discharge characteristics of a lithium battery.

The inorganic material used in the preparation of the composite cathode active material may include a nitride or carbide of at least one element from Group 2, Group 13, Group 14, and Group 15 of the periodic table of elements. That is, the inorganic material used in the preparation of the composite cathode active material may include a nitride or a carbide of at least one element, which may be selected from the group of Group 2, Group 13, Group 14, and/or Group 15 of the periodic table of elements In an implementation, the composite cathode active material may include a nitride or carbide of at least one element selected from the group of Be, Mg, Ca, Sr, Ba, B, Al, Ga, In, Ti, Si, Ga, Sn, Pb, P, As, Sb, Bi, Sc, Ti, V, Cr, Fe, Cu, and Zn.

In an implementation, the inorganic material may include at least one selected from the group of boron nitride (BN), boron carbide ($B_4C$), silicon nitride ($Si_3N_4$), niobium nitride (NbN), silicon carbide (SiC), aluminum nitride (AlN), a boron nitride-boron carbide complex, a boron nitride-silicon nitride ($Si_3N_4$) complex, a boron nitride-niobium nitride (NbN) complex, a boron nitride-silicon carbide (SiC) complex, and a boron nitride-aluminum nitride (AlN) complex.

In another implementation, the inorganic material used in preparing the composite cathode active material may include boron. For example, the inorganic material may include boron nitride or boron carbide.

The boron nitride may include at least one selected from the group of an amorphous boron nitride, a boron nitride with a cubic crystalline structure, a boron nitride with a hexagonal crystalline structure, and a boron nitride with a wurtzite crystalline structure.

In the method of preparing the composite cathode active material, the sintering may be performed, e.g., at a temperature of about 400° C. to about 900° C. for about 2 to 48 hours. The temperature and time ranges may be appropriately adjusted to help improve the electric conductivity of the composite cathode active material. In an implementation, the sintering may be performed at a temperature of about 500° C. to about 700° C. In an implementation, the sintering may be performed for about 5 to about 10 hours.

The mixture used in the preparing of the composite cathode active material may further include a carbonaceous material. The inclusion of the carbonaceous material may help further improve the electrical conductivity of the composite cathode active material.

The carbonaceous material may include at least one selected from the group of graphite, carbon black, amorphous carbon, fibrous carbon, and a combination thereof. Any suitable carbonaceous material capable of improving the conductivity of the composite cathode active material may be used.

The carbonaceous material may include a carbon precursor capable of forming a carbonaceous material by sintering. Non-limiting examples of the carbon precursor capable of forming a carbonaceous material by sintering may include a polymer, sugar alcohol, and sucrose.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Preparation of Composite Cathode Active Material

EXAMPLE 1

$Li_2CO_3$, $MnCO_3$, $FeC_2O_4$, and $NH_4H_2PO_4$ were mixed in a mole ratio of 0.5:0.9:0.1:1.0. 4.8 wt % of carbon powder (Ketjen Black 600JD) and 0.2 wt % of boron nitride (BN) were added to the mixture, based on a total weight of the mixture. Then, the mixture was sintered under an inert atmosphere (nitrogen atmosphere) at about 600° C. for about 6 hours to prepare a composite cathode active material. The composite cathode active material included a compound with an olivine crystal structure represented by $LiMn_{0.9}Fe_{0.1}PO_4$.

EXAMPLE 2

$Li_2CO_3$, $MnCO_3$, $FeC_2O_4$, and $NH_4H_2PO_4$ were mixed in a mole ratio of 0.5:0.9:0.1:1.0. 4.6 wt % of carbon powder (Ketjen Black 600JD) and 0.4 wt % of boron nitride (BN) were added to the mixture, based on the total weight of the mixture. Then, the mixture was sintered under an inert atmosphere (nitrogen atmosphere) at about 600° C. for about 6 hours to prepare a composite cathode active material.

EXAMPLE 3

$Li_2CO_3$, $MnCO_3$, $FeC_2O_4$, and $NH_4H_2PO_4$ were mixed in a mole ratio of 0.5:0.9:0.1:1.0. 4.0 wt % of carbon powder (Ketjen Black 600JD) and 1.0 wt % of boron nitride (BN) were added to the mixture, based on the total weight of the mixture. Then, the mixture was sintered under an inert atmosphere (nitrogen atmosphere) at about 600° C. for about 6 hours to prepare a composite cathode active material.

EXAMPLE 4

$Li_2CO_3$, $FeC_2O_4$, and $NH_4H_2PO_4$ were mixed in a mole ratio of 0.5:1.0:1.0. 4.8 wt % of carbon powder (Ketjen Black 600JD) and 0.2 wt % of boron nitride (BN) were added to the mixture, based on the total weight of the mixture. Then, the mixture was sintered under an inert atmosphere (nitrogen atmosphere) at about 600° C. for about 6 hours to prepare a composite cathode active material. The composite cathode active material included a compound with an olivine crystal structure represented by LiFePO$_4$.

EXAMPLE 5

Li$_2$CO$_3$, FeC$_2$O$_4$, and NH$_4$H$_2$PO$_4$ were mixed in a mole ratio of 0.5:1.0:1.0. 4.0 wt % of carbon powder (Ketjen Black 600JD) and 1.0 wt % of boron nitride (BN) were added to the mixture, based on the total weight of the mixture. Then, the mixture was sintered under an inert atmosphere (nitrogen atmosphere) at about 600° C. for about 6 hours to prepare a composite cathode active material.

COMPARATIVE EXAMPLE 1

Li$_2$CO$_3$, MnCO$_3$, FeC$_2$O$_4$, and NH$_4$H$_2$PO$_4$ were mixed in a mole ratio of 0.5:0.9:0.1:1.0, and 5.0 wt % of carbon powder (Ketjen Black 600JD) was added to the mixture, based on the total weight of the mixture. Then, the mixture was sintered in an inert atmosphere (nitrogen atmosphere) at about 600° C. for about 6 hours to prepare a composite cathode active material.

COMPARATIVE EXAMPLE 2

Li$_2$CO$_3$, FeC$_2$O$_4$, and NH$_4$H$_2$PO$_4$ were mixed in a mole ratio of 0.5:1.0:1.0. 5.0 wt % of carbon powder (Ketjen Black 600JD) was added to the mixture, based on the total weight of the mixture. Then, the mixture was sintered under an inert atmosphere (nitrogen atmosphere) at about 600° C. for about 6 hours to prepare a composite cathode active material.

Manufacture of Cathode and Lithium Battery

EXAMPLE 6

97 wt % of the composite cathode active material powder prepared in Example 1, 3 wt % of polyvinylidene fluoride (PVDF), and N-methylpyrrolidone (NMP) (in an amount such that a weight ratio of NMP:PVDF was about 10:1) were mixed together in an agate mortar to prepare a slurry. The slurry was coated on a Cu current collector to a thickness of about 15 μm using a doctor blade. Then, the resultant was dried at about 80° C. for about 2 hours, and then dried again at about 110° C. in a vacuum for about 2 hours to manufacture a cathode plate.

The cathode plate, a lithium metal (constituting a counter electrode), a polypropylene layer (Celgard 3501) (constituting a separator), and an electrolyte solution obtained by preparing a 1 M LiPF$_6$ solution in a mixed solvent of ethylene carbonate (EC) and diethylene carbonate (DEC) (volume ratio of 3:7) were used to manufacture a 2032 sized coin cell.

EXAMPLES 7-10

Cathodes and lithium batteries were manufactured in the same manner as in Example 7, except that the composite cathode active materials of Examples 2-5, instead of the composite cathode active material of Example 1, were used.

COMPARATIVE EXAMPLES 3-4

Cathodes and lithium batteries were manufactured in the same manner as in Example 7, except that the composite cathode active materials of Comparative Examples 1-2, instead of the composite cathode active material of Example 1, were used.

EVALUATION EXAMPLE 1

Charge-Discharge Test

The lithium batteries manufactured according to Examples 6 to 10 and Comparative Examples 3-4 were charged by applying a current of about 0.05 C (7.5 mA) per 1 g of the cathode active material until a voltage reached 4.5 V (with respect to Li), followed by constant voltage charging at a constant voltage of 4.5 V until the current reached 0.01 C, and then constant current discharging with an increasing current density until the voltage reached 2.0 V (with respect to Li) was performed. While the charge-discharge cycle was repeated, current density for discharging was sequentially increased. The current density for each discharging were 0.05 C, 0.1 C, 0.2 C, 0.5 C, 1 C, 2 C, and 5 C rate. The high-rate charge/discharge test results are shown in Table 1 and FIG. 1.

TABLE 1

| C-rate | Comparative Example 3 [mAh/g] | Comparative Example 4 [mAh/g] | Example 6 [mAh/g] | Example 7 [mAh/g] | Example 8 [mAh/g] | Example 9 [mAh/g] | Example 10 [mAh/g] |
|---|---|---|---|---|---|---|---|
| 0.05 | 120.6 | — | 140.4 | 146.2 | 155.2 | — | — |
| 0.1 | 117.2 | 152.6 | 137.4 | 143.5 | 155.1 | 158.6 | 162.1 |
| 0.2 | 111.5 | 147.7 | 132.9 | 139.0 | 152.7 | 156.4 | 159.4 |
| 0.5 | 100.6 | 142.8 | 124.8 | 129.7 | 146.9 | 152.4 | 154.7 |
| 1 | 90.8 | 137.2 | 114.2 | 119.8 | 140.8 | 147.7 | 150.0 |
| 2 | 80.5 | 127.0 | 102.8 | 108.0 | 132.8 | 141.3 | 143.3 |
| 5 | 61.4 | 118.4 | 84.7 | 88.9 | 118.7 | 129.7 | 132.2 |

Referring to Table 1 and FIG. 1, it may be seen that the lithium batteries of Examples 6-1012 (manufactured using the composite cathode active materials of Examples 1-5, respectively) exhibited improved discharge capacity and high-rate characteristics, as compared to the lithium battery of Comparative Examples 3-4.

By way of summation and review, as a cathode active material with an olivine crystal structure, e.g., LiFePO$_4$, may be kept stable during charging and discharging without structural changes, may not cause a side effect of oxygen generation, and may have a low cost. LiFePO$_4$ may be low in electrical conductivity and energy capacity. The embodiments provide a cathode active material having an olivine crystal structure that exhibits improved electrical conductivity.

As described above, according to the embodiments, by using a composite cathode active material including an inorganic material, a lithium battery may have improved high-rate characteristics and high discharge capacity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composite cathode active material, comprising:
a compound with an olivine crystal structure; and
an inorganic material, the inorganic material including a nitride or carbide of at least one element selected from the group of Group 2, Group 13, Group 14, and Group 15 of the periodic table of elements,
wherein the inorganic material includes at least one selected from the group of an amorphous boron nitride, a boron nitride with a cubic crystalline structure, a boron nitride with a hexagonal crystalline structure, and a boron nitride with a wurtzite crystalline structure, the inorganic material is included in the composite cathode active material in an amount of about 0.2 wt % to about 1.0 wt %, based on a total weight of the composite cathode active material, and the inorganic material improves the electrical conductivity of the compound of the olivine crystal structure by being dispersed in the composite cathode active material, and
wherein the compound with the olivine crystal structure is represented by Formula 2 below:

$$Li_xMn_{1-z}M'_zPO_{4-d}X_d \quad \text{Formula 2}$$

wherein, in Formula 2, $0.6 \leq x \leq 1.1$, $0 \leq z \leq 0.2$, and $0 \leq d \leq 0.2$;
M' includes at least one selected from the group of Fe, Ni, Co, Mg, Ca, Cu, Nd, Sr, Ba, Ti, Zr, Nb, Mo, W, Zn, Al, and Si; and
X includes at least one selected from the group of S and F.

2. The composite cathode active material as claimed in claim 1, wherein the inorganic material does not include a nitride of a transition metal.

3. The composite cathode active material as claimed in claim 1, wherein the compound with the olivine crystal structure includes $LiMn_{0.9}Fe_{0.1}PO_4$.

4. The composite cathode active material as claimed in claim 1, wherein the compound with the olivine crystal structure includes $LiFe_{1-a}Mn_aPO_4 (0<a<1)$.

5. The composite cathode active material as claimed in claim 1, wherein the inorganic material further includes a nitride or carbide of a metalloid element selected from the group of Group 13, Group 14, and Group 15 of the periodic table of elements.

6. The composite cathode active material as claimed in claim 1, wherein the inorganic material further includes at least one selected from the group of boron carbide ($B_4C$), silicon nitride ($Si_3N_4$), silicon carbide (SiC), a boron nitride-boron carbide complex, a boron nitride-silicon nitride ($Si_3N_4$) complex, and a boron nitride-silicon carbide (SiC) complex.

7. The composite cathode active material as claimed in claim 1, wherein the inorganic material is in the form of at least one selected from the group of a nanoparticle, a nanofiber, a nanomesh, and a nanotube.

8. The composite cathode active material as claimed in claim 1, wherein the inorganic material has a Mohs hardness greater than a Mohs hardness of the compound with the olivine crystal structure.

9. The composite cathode active material as claimed in claim 1, wherein the inorganic material has a Mohs hardness of about 1 or greater.

10. The composite cathode active material as claimed in claim 1, wherein the inorganic material has an electrical conductivity lower than that of amorphous carbon.

11. The composite cathode active material as claimed in claim 1, wherein the inorganic material has an electrical conductivity of about $10^{-1}$ S/cm or less.

12. The composite cathode active material as claimed in claim 1, further comprising a carbonaceous material.

13. The composite cathode active material as claimed in claim 12, wherein the carbonaceous material is included in an amount of about 0.1 wt % to about 30 wt % based on a total weight of the composite cathode active material.

14. A cathode comprising the composite cathode active material as claimed in claim 1.

15. A lithium battery comprising the cathode as claimed in claim 14.

* * * * *